Aug. 12, 1969  G. A. HIGHBERG  3,460,849
VARIABLE FORCE CHUCK CONSTRUCTION
Filed Jan. 11, 1966  2 Sheets-Sheet 1
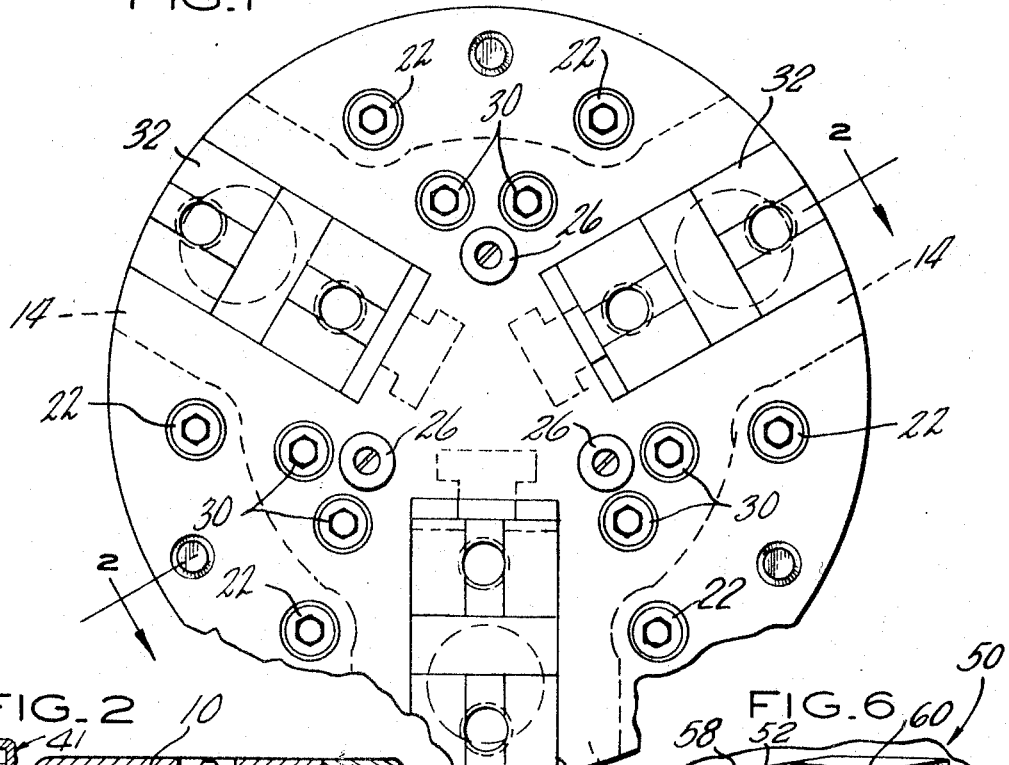
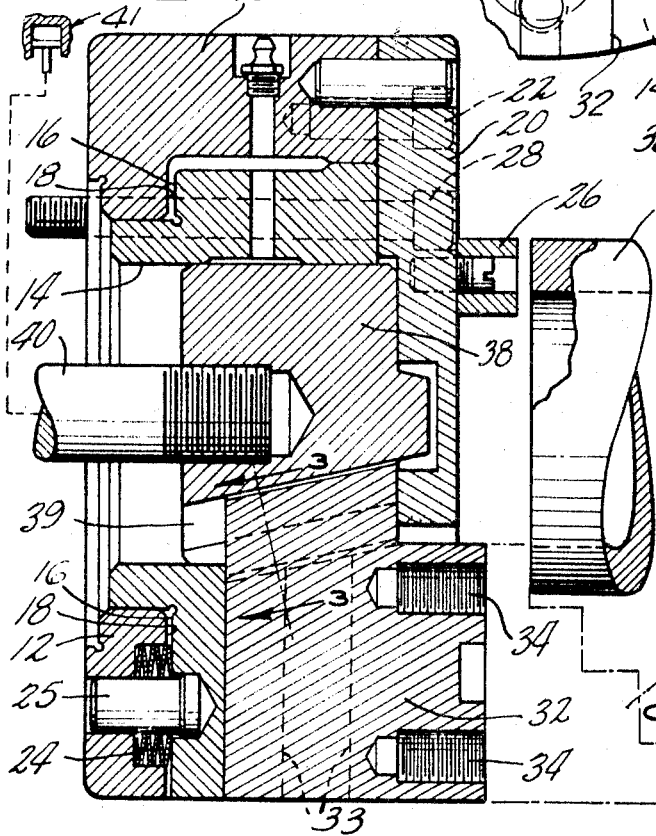
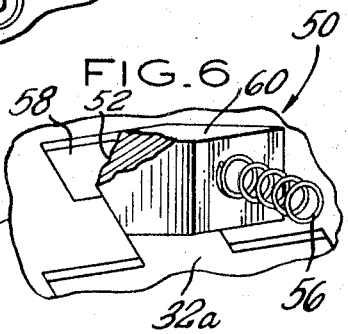
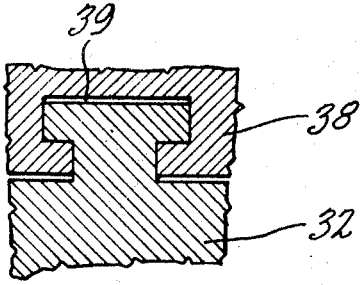
INVENTOR.
GEORGE A. HIGHBERG
BY
McCormick, Paulding & Huber
ATTORNEYS Aug. 12, 1969   G. A. HIGHBERG   3,460,849
VARIABLE FORCE CHUCK CONSTRUCTION
Filed Jan. 11, 1966   2 Sheets-Sheet 2
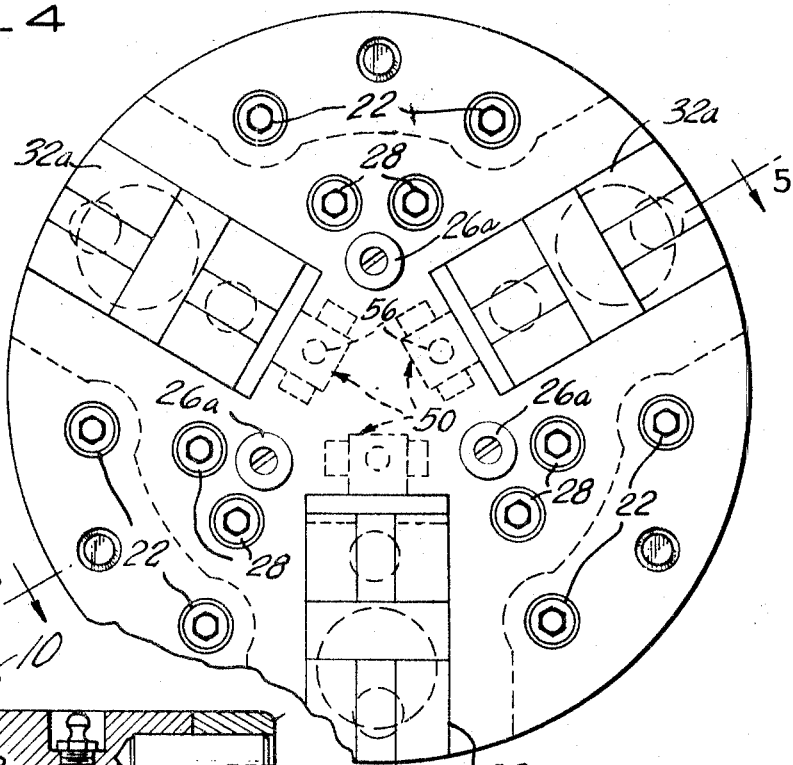
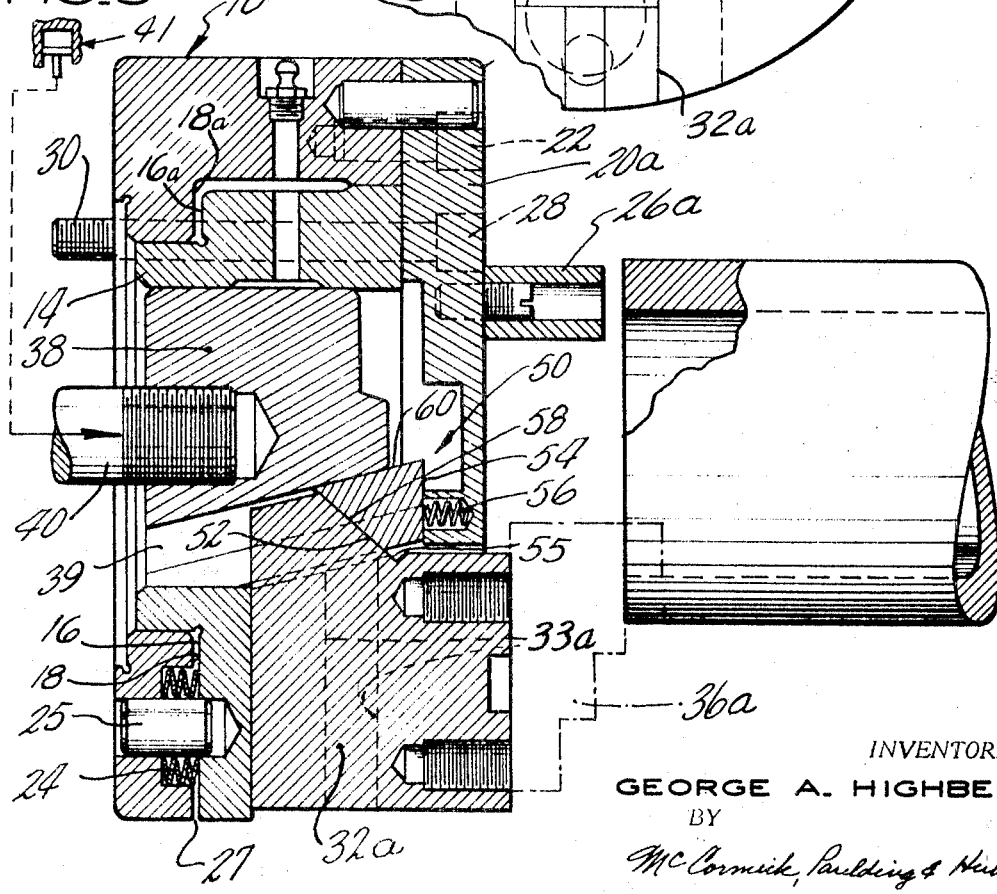
INVENTOR.
GEORGE A. HIGHBERG
BY
McCormick, Paulding & Huber
ATTORNEYS United States Patent Office 3,460,849
Patented Aug. 12, 1969

3,460,849
VARIABLE FORCE CHUCK CONSTRUCTION
George A. Highberg, West Hartford, Conn., assignor, by mesne assignments, to The S-P Manufacturing Corporation, a corporation of Ohio
Filed Jan. 11, 1966, Ser. No. 519,926
Int. Cl. B23b 31/16, 5/22, 5/34
U.S. Cl. 279—121
5 Claims

ABSTRACT OF THE DISCLOSURE

A drawbar operated chuck having an inner part on which the jaw carriers are mounted for radial movement, and an outer part in which the inner part, and its jaw carriers, are supported for limited axial movement. The drawbar is operated by a conventional fluid cylinder, and carries a plug at its forward end for moving the jaw carriers radially in response to axial movement of the plug. The inner part is spring-biased forwardly and a workpiece can be gripped externally by retracting the drawbar rearwardly. However, when the workpiece is engaged the inner part is moved rearwardly compressing the springs to seat the workpiece against a face plate which comprises the outer portion of the chuck body. Once seated further drawbar force serves to grip the workpiece tighter between the chuck jaws. For internal gripping one embodiment utilizes mechanical wedges between forwardly facing, axially inclined, camming surfaces on the plug, and on the jaw carriers, for urging the latter rearwardly in response to forward extension of the drawbar.

---

This invention relates to chuck constructions, and deals more particularly with an improved chuck construction wherein the workpiece is gripped with a force which is applied in the usual radial clamping direction and also in an axial direction so as to seat the workpiece against the face of the chuck.

Prior known chucks embody radially movable jaws that move radially in a transverse plane during the chucking operation, or they embody jaws that move axially and radially at the same time. In the first case the chuck jaws have a tendency to move the workpiece away from the face of the chuck so that pounding of the work is frequently required to properly seat the workpiece relative to the chuck face. In the latter case several alternative chuck designs have been proposed which employ one or more levers for moving the jaws arcuately in a combined radial and axial movement so as to draw the workpiece against the face of the chuck as it is clamped radially. It will be apparent to those skilled in the art that the conventional T-slot construction between the chuck and the jaw carriers cannot be used with this type of design and hence a rather complicated expensive chuck construction must be adopted in order to accomplish this simultaneous radial and axial movement.

A general object of the present invention is to provide a chuck construction in which the pounding of the workpiece by the operator is eliminated; and in which the jaws are adapted to move radially until they contact the workpiece, and then axially until the workpiece is seated against the face of the chuck, and finally to move radially in a final clamping action to secure the workpiece against rotation relative to the spindle structure supporting and rotating the chuck.

Another general object of the present invention is to provide a chuck construction of the foregoing character in which the jaw carriers are conventionally mounted in T-slots defined in the frame of the chuck to provide a chuck of simple but yet rugged construction having a minimum number of moving parts.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:
FIG. 1 is a front elevational view of a variable force chuck constructed in accordance with the present invention;
FIG. 2 is a sectional view taken along the line 2—2 of FIG. 1;
FIG. 3 is a sectional view of a portion of the FIG. 1 device and is taken along the line 3—3 of FIG. 2;
FIG. 4 is a front elevational view of a variable force chuck of alternative construction;
FIG. 5 is a sectional view taken along the line 5—5 of FIG. 4; and
FIG. 6 is a perspective view of a portion of the chuck construction shown in FIG. 5.

Turning now to the chuck construction shown in FIGS. 1, 2, and 3, the illustrated chuck is shown as including a generally cylindrical body comprising a first or outer part 10 having an inset rear face 12 for engaging the spindle structure (not shown) of a conventional lathe or the like. The first body part 10 is generally annular in shape and a second, or inner body part 14, is slidably mounted in concentric relation with respect thereto for slidable movement in an axial direction between a retracted position, wherein an external shoulder 16 defined in said second body part engages a radially extending internal shoulder 18 on the first body part 10, and the position shown in FIG. 2.

Biasing means is provided for urging said second body part 14 forwardly toward the position shown. A face plate 20 is rigidly attached to the forward end of the first body part 10 by a plurality of screws 22, 22 and defines a rearwardly facing abutment surface against which the second body 14 can abut at the urging of three sets of circumaxially Belleville springs 24, 24 which springs comprise said biasing means. Preferably, and as shown, each set of springs 24 is retained in a suitable cavity cooperatively defined by said inner and outer body parts and a locating pin 25 is affixed to the outer part 10 and extends through the spring set 24 and into an aligned opening 27 in the inner body part 14 where it is slidably received to maintain the frame parts in aligned relation as the inner part 14 moves axially with respect to the outer part 10.

The face plate 20 covers the front of the chuck and includes a series of work-engaging buttons 26, 26 the function of which will become apparent hereinbelow. The above-mentioned parts comprise the body of the chuck and a series of circumaxially spaced openings are provided in this body, as indicated at 28, to receive a series of relatively long machine screws 30, 30 which screws extend through the chuck as shown for attachment of the chuck to the spindle structure of a lathe or the like.

As best shown in FIG. 1, a plurality of radially reciprocable jaw carriers 32, 32 are slidably received in radially extending guide slots defined in the body so that the jaw carriers 32, 32 are restrained to move radially only with respect to the inner frame part 14. More specifically, three such jaw carriers are shown in equally spaced circumaxial relationship and each moves in a radially extending slot in the face plate 20. The slot extends outwardly to the periphery of the face plate as shown. Each jaw carrier 32 also has an underlying T-shape permitting the carrier to slide in a complementary T- slot 33 in the inner body part 14. The three T-slots in the body part 14 extend radially of the chuck in radially projecting portions of said body part, which projecting portions overlay the outer body part 10 and extend to the periphery of the face plate 20 and underlay the slots therein. The T-slot connection between the inner body part 14 and the jaw carriers 32, 32 is thus conventional, and the jaw carriers can move only radially with respect to the body part 14. However, the carriers can be moved axially with respect to the face plate 20 and the outer body part 10 due to movement of the inner body part 14 relative to the outer body part as will be described.

As best shown in FIG. 2, each of the jaw carriers 32, defines threaded openings to receive screws used to attach a jaw thereto as shown at 36. The jaw shown is intended for external gripping and it will be apparent to those skilled in the art that any work-engageable jaw can be adapted for use with the jaw carriers shown. It will also be apparent that any conventional number of jaw carriers might be used in a chuck of the present invention, the three equally spaced jaw carriers shown in FIG. 1 being chosen for purposes of illustration only.

As best shown in FIG. 2, the second or inner body part 14 has an axial bore in which a generally cylindrical plug 38 is slidably received for forward and rearward movements relative to the chuck body or frame in response to the reciprocations of a drawbar 40 which is threaded to the plug. The drawbar 40 is located along the axis of rotation of the chuck and is adapted to be reciprocated by an air or oil cylinder 41 as is well known in this art.

The plug 38 will be seen from FIG. 3 to define a plurality of axially inclined T-shaped camming surfaces or slots 39, 39 for engaging complementary T-shaped projections provided on the radially inner ends of each of the jaw carriers 32, 32 to achieve radial movement of the jaws 36, 36 in response to axial movement of the plug 38. It will be apparent from FIG. 2 that rearward axial movement of the drawbar 40 and of the plug 38 will be accompanied by inward radial movement of the jaw carriers 32, 32 at least as long as the inner body part 14 does not move relative to the outer body part 10. It will also be apparent that when the jaws 36, 36 engage a workpiece, as for example the pipe 42, the plug 38 cannot be moved any farther rearwardly without carrying the inner body part 14 along. The drawbar 40 must then be pulled rearwardly with a greater force to carry the inner frame part 14 with it, and it is an important feature of the present invention that such a force compresses the Belleville springs 24, 24 as the inner frame part moves relative to the outer frame part 10. As a result of the T-slot construction between the jaw carriers 32 and the plug 38, the jaw 36 will thus move axially inwardly until the workpiece engages the buttons 26, 26 provided on the face plate 20 for this purpose.

Once the workpiece has engaged the buttons 26, 26 or once the body part shoulders 16 and 18 are engaged further pressure in the actuating cylinder tending to pull the drawbar rearwardly will only provide a greater radial gripping force between the jaw 36 and the workpiece as is conventional with drawbar operated chucks. Thus, the gripping action achieved with a chuck of the present invention can be divided into three distinct phases. The first phase involves a preliminary radially inwardly directed movement of the jaws until the workpiece is engaged with a force which is predetermined to a large extent by the spring sets 24, 24. The second phase comprises a rearward axial movement of the jaws with respect to the work-engaging face of the chuck. It will be apparent that the workpiece is seated securely against the chuck face during this second phase. The third phase involves the conventional radially inwardly directed final clamping action of the circumaxially spaced jaws 36, 36.

Turning now to the chuck construction shown in FIGS. 4, 5 and 6, an alternative embodiment is there depicted which incorporates all of the features of the above-described external gripping chuck, and also provides the same motions with respect to internal gripping. In these figures similar parts are designated by the same reference numerals as used in describing the previous embodiment and generally similar parts are designated by the same reference numerals to which the letter a has been appended.

Very briefly, this embodiment is capable of the same external gripping action as that just described with respect to FIGURES 1, 2 and 3. In addition, the FIGURE 5 embodiment also includes suitable means for achieving a rearward axial movement of the chuck jaws in response to a forward axial movement of the drawbar. It will be recalled that the drawbar moves rearwardly in the foregoing embodiment to achieve the inward radial jaw movement associated with external gripping. As shown in FIGURE 5, and as described in detail hereinbelow, wedge means 50 is provided in the alternative chuck construction to achieve a rearward axial movement of the chuck jaws in response to the forward axial stroke of the drawbar associated with internal gripping.

The alternative chuck construction shown in FIG. 5 comprises a first or outer body part 10 having an internal bore which slidably receives a second or inner body part 14. As in the previous embodiment, shoulders 16 and 18 defined on said respective body or frame parts will limit rearward axial movement of the inner part 14. Again, as in the previous embodiment, biasing means is provided for urging the body part 14 forwardly toward the position shown. A face plate 20a is rigidly attached to the forward end of the first frame part 10 by a plurality of screws 22, 22 and said face plate defines a rearwardly facing abutment surface against which the second frame part 14 can abut at the urging of three sets of circumaxially spaced Belleville springs 24, 24 which springs comprise the aforementioned biasing means. The face plate 20a defines a front face of the chuck and includes a series of work-engaging buttons 26a, 26a the function of which is the same as that described hereinabove with respect to the previous embodiment. The above-mentioned parts comprise the frame or body of the chuck, and a series of circumaxially spaced openings are provided in this frame as indicated at 28 to receive a series of relatively long machine screws 30, 30 which screws are adapted to extend through the chuck as shown for attachment of the chuck to a spindle structure or the like.

As best shown in FIG. 4, a plurality of radially reciprocable jaw carriers 32a, 32a are slidably received in radially extending guide slots 33a defined in the frame and each of said slots comprise a T-shaped guideway which restrains each jaw carrier for movement in a radial direction only with respect to the inner frame part 14. The jaw carriers are thus restricted against axial movement with respect to said inner frame part. As in the previous embodiment, each of the jaw carriers 32a, 32a defines threaded openings to receive screws used in attaching a paw thereto as shown at 36a. The jaw shown is intended for internal gripping and it will be apparent to those skilled in the art that any work-engageable jaw might be adapted for use with the jaw carrier shown. It will, of course, also be apparent that any convenient number of jaw carriers might be used in a chuck of the present invention, the three circumaxially spaced jaw carriers shown in FIG. 4 being chosen for purposes of illustration only.

As best shown in FIG. 5, the second or inner frame part 14 defines an axially arranged bore in which a generally cylindrical plug 38 is slidably received for forward and rearward movement relative to the chuck body or frame in response to the reciprocations of a drawbar 40. As in the previous embodiment, the drawbar 40 is located on the axis of rotation of the chuck and is adapted to be reciprocated by an air or oil cylinder (not shown) well known in this art. As in the previous embodiment, the plug 38 defines a plurality of axially inclined camming surfaces 39, 39 for engaging complementary surfaces provided on the radially inner ends of each of the jaw carriers 32a, 32a to achieve radial movement of the jaws 36a, 36a in response to axial movement of the plug 38. It will be apparent that forward axial movement of the drawbar 40, and of the plug 38, will be accompanied by outward radial movement of the jaw carriers 32a, 32a at least so long as the inner frame part 14 does not move relative to the outer frame part 10. It will also be apparent that rearward axial movement of the drawbar 40 and of the plug 38 will be accompanied by inward radial movement of the jaw carriers when said inner frame part 14 does not move relative to the outer frame part 10. In the latter case (for external gripping) the jaws 36a, 36a would be replaced by jaws of the type shown and described with respect to the previous embodiment. Thus, the chuck construction shown in FIG. 5 will function in the same manner as the previously described embodiment in gripping work externally, the Belleville springs functioning in the same manner as described with reference to FIGURE 2.

In further accord with the present invention, forward axial movement of the drawbar 40, and of the plug 38 will be accompanied by a preliminary outward radial movement of the jaw carriers 32a, 32a provided only that the inner frame part 14 to which the jaw carriers are connected does not move relative to the outer frame part 10. As in the previously described embodiment, once the workpiece is engaged by the jaws 36a, 36a a somewhat greater force is required to be exerted by the drawbar 40 and it is this force which is used to move the jaw carriers axially so as to seat the workpiece agaist suitable buttons 26a, 26a provided for this purpose on the face plate 20a.

In the embodiment shown, wedge means, indicated generally at 50, is provided for engaging each of the jaw carriers 32a, and urging the latter rearwardly in a generally axial direction in response to the forwardly directed force of the drawbar. Preferably, and as shown, the wedge means 50 comprises a trapezoidally shaped block, best shown in FIG. 6, which block has a jaw carrier engaging rear face 52, and a forward face 54 which is adapted to engage the rearwardly facing surface of the face plate 20a as shown in FIG. 5. The face 54 is also engaged by a locating spring 56. The jaw carrier 32a will be seen from FIGURES 5 and 6 to have a relieved inner end which defines an inclined surface 58 for engaging the rear face 52 of the wedge means 50. The locating spring 56 will be seen to urge said wedge means 50 rearwardly so that these surfaces 52 and 58 remain in sliding engagement during radial movement of the jaw carrier 32a.

Finally, and still with reference to the wedge means 50, a radially inwardly facing surface thereof, indicated generally at 60, is adapted to engage a radially outwardly facing portion of each of the circumaxially spaced jaw carrier camming surfaces which are defined in the plug 38. The wedge means 50 will thus be seen to have three contiguous faces or surfaces 52, 54 and 60 which are so oriented with respect to one another that the faces 52 and 54 form an angle of significantly less than 90°, and further the rear face 52 is in sliding engagement with the jaw carrier surface 58. As so constructed, the wedge means 50 will be seen from FIG. 5 to exert a force on the jaw carrier 32a, which force has a rearwardly directed axial component once the jaw 36a engages the workpiece as shown in FIG. 5. As with the external gripping described hereinabove, an additional forwardly directed force will be required to be exerted by the drawbar 40 to overcome the resistance offered by the springs 24, 24 and at some predetermined value of drawbar force some slipping will occur between the wedge face 52 and the jaw carrier face 58 and the carrier together with the frame part 14 to which it is attached will be urged rearwardly with respect to the outer frame part 10 compressing the Belleville springs 24, 24 and drawing the workpiece rearwardly so that it seats against the buttons 26a, 26a provided for this purpose on the face of the chuck. As in the previously described embodiment, once the Belleville springs 24, 24 have been compressed, and the shoulders 16 and 18 on the inner and outer frame parts 14 and 10 respectively have contacted one another, or once the work has engaged the buttons 26a, 26a, any further increase in drawbar force will serve to clamp the workpiece radially in a conventional manner.

The invention claimed is:

1. A chuck for a lathe or the like comprising a body which includes a first part adapted for attachment to the lathe spindle and a second part slidably mounted in said first part for limited axial movement relative thereto, a face plate secured on said first body part for engagement by a workpiece, biasing means urging said second body part forwardly relative to the first part, a plurality of radially reciprocable jaw carriers slidably supported in the second body part and restricted against axial movement relative thereto, said jaw carriers having axially inclined camming surfaces at the inner ends thereof, an axially slidable plug received in said second body part and having axially inclined camming sufaces engaging the camming surfaces on the carriers to cause inward and outward radial movement of the carriers in response to rearward and forward axial movements respectively of the plug, power means for axially moving said plug in a forward direction to cause outward radial movement of the carriers until jaws carried thereby engage a workpiece, and means associated with said second body part so that additional forward movement of said plug causes rearward axial movement of said second body part against said biasing means to draw the workpiece into engagement with the face plate and whereupon additional force on said plug in said one direction causes a further radial clamping action of the jaws against the workpiece.

2. A chuck as set forth in claim 1 and further characterized in that said means for achieving rearward axial movement of said jaw carriers in response to forward movement of said plug comprises an axially inclined forwardly facing camming surface at its inner end, and said chuck being further characterized by a plurality of wedges each of which has an inner surface for engagement with one of said plug defined camming surfaces respectively, each of said wedges having an axially inclined rear face for engaging said jaw carrier and a front face for engaging said face plate.

3. A chuck for a lathe comprising a generally cylindrical body which includes a generally annular outer part adapted for attachment to the lathe spindle and having a forwardly facing internal shoulder, said body further including an inner part slidably received in said outer part and having a radially outwardly extending rearwardly facing shoulder engageable with said forwardly facing internal shoulder defined on said outer body part to limit rearward movement of the former with respect to the latter, said outer body part having a face plate at its forward end for engagement by a workpiece, said face plate having a rearwardly facing abutment surface for engaging said inner body and limiting forward movement thereof, biasing means for urging said inner part forwardly toward said abutment surface, a plurality of circumaxially spaced jaw carriers each of which is slidably received in a radially extending T-shaped guide slot defined in said inner part to restrict said carriers to radial movement only with respect to said inner body part, a plug slideably received in said inner part for axial movement with respect thereto, said plug defining axially inclined guide slots of T-shaped cross section, and T-shaped protrusions at the inner radial ends of said jaw carriers, which protrusions are slidably received in said plug defined inclined guide slots for attributing outward radial movement to said jaw carriers in response to forward axial movement of said plug, power means for selectively moving said plug in a forward and a rearward axial direction to cause radial movement of the carriers until jaws carried thereby engage a workpiece, said jaw carrier inner ends further including a forwardly facing surface adjacent said T-shaped protrusion, a plurality of wedges each of which has an inner surface for engagement with a segment of said plug defined guide slot respectively, each of said wedges further including a rear face for engaging said forwardly facing jaw carrier surface and a front face for engaging said face plate, whereby forward axial movement of said plug initially causes outward radial movement of the carriers until a workpiece is engaged, additional forward plug movement causing rearward axial movement of said inner part to seat the workpiece followed by further radially outwardly directed clamping action for the workpiece.

4. A chuck as set forth in claim 3 and further characterized by forwardly facing workpiece engageable buttons removably mounted on said face plate to allow buttons of various axial lengths to be used in conjunction with jaws of various configurations.

5. A chuck as set forth in claim 3 wherein said biasing means comprises a plurality of circumaxially spaced Belleville type compression spring sets retained in suitable cavities defined by said inner and outer parts, and a spring locating pin associated with each of said circumaxially spaced spring sets, one end of each of said pins being affixed to one of said parts, and an opposite end of each of said pins being slidably received in an aligned opening in the other said part.

References Cited

UNITED STATES PATENTS

| 1,305,138 | 5/1919 | McClellan | 279—121 |
| 1,487,411 | 3/1924 | Wasson. | |
| 2,473,380 | 6/1949 | Ljunggren. | |
| 3,085,813 | 4/1963 | Sampson | 279—119 |
| 3,266,812 | 8/1966 | Mott | 279—121 |

ROBERT C. RIORDON, Primary Examiner